United States Patent
Otsuki et al.

(10) Patent No.: US 9,293,765 B2
(45) Date of Patent: Mar. 22, 2016

(54) PROCESS FOR PRODUCTION OF (RARE EARTH)-MG-NI-BASED HYDROGEN STORAGE ALLOY

(75) Inventors: Takayuki Otsuki, Kobe (JP); Toshio Irie, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 653 days.

(21) Appl. No.: 13/806,423

(22) PCT Filed: Jun. 24, 2011

(86) PCT No.: PCT/JP2011/064558
§ 371 (c)(1),
(2), (4) Date: Feb. 26, 2013

(87) PCT Pub. No.: WO2011/162385
PCT Pub. Date: Dec. 29, 2011

(65) Prior Publication Data
US 2013/0142690 A1    Jun. 6, 2013

(30) Foreign Application Priority Data
Jun. 24, 2010  (JP) ................................. 2010-159124

(51) Int. Cl.
| | | |
|---|---|---|
| *H01M 4/38* | (2006.01) | |
| *B22F 9/04* | (2006.01) | |
| *C22C 19/00* | (2006.01) | |
| *B22F 3/10* | (2006.01) | |
| *C22F 1/10* | (2006.01) | |
| *C01B 3/00* | (2006.01) | |
| *C22C 1/02* | (2006.01) | |
| *C22C 1/04* | (2006.01) | |
| *C22C 19/03* | (2006.01) | |
| *H01M 10/34* | (2006.01) | |

(52) U.S. Cl.
CPC .................. *H01M 4/383* (2013.01); *B22F 3/10* (2013.01); *B22F 9/04* (2013.01); *C01B 3/0057* (2013.01); *C22C 1/023* (2013.01); *C22C 1/04* (2013.01); *C22C 19/00* (2013.01); *C22C 19/007* (2013.01); *C22C 19/03* (2013.01); *C22F 1/10* (2013.01); *H01M 10/345* (2013.01); *Y02E 60/124* (2013.01); *Y02E 60/327* (2013.01)

(58) Field of Classification Search
CPC ............ H01M 4/383; B22F 3/10; B22F 9/04; C22C 19/00; C22F 1/10; C22F 1/18
See application file for complete search history.

(56) References Cited

U.S. PATENT DOCUMENTS

| | | | |
|---|---|---|---|
| 7,582,381 | B2 | 9/2009 | Kihara et al. |
| 7,988,800 | B2 | 8/2011 | Osawa et al. |
| 2009/0007728 | A1 | 1/2009 | Akiba et al. |

FOREIGN PATENT DOCUMENTS

| | | | |
|---|---|---|---|
| CN | 1563453 A | 1/2005 | |
| CN | 1937287 A | 3/2007 | |
| JP | 2000-54009 A | 2/2000 | |
| JP | 2002-105564 A | 4/2002 | |
| JP | 2002-167609 A | 6/2002 | |
| JP | 2004-154837 A | 6/2004 | |
| JP | 2004-292838 A | 10/2004 | |
| WO | WO 2005/061104 | * 7/2005 | ............... B01J 23/00 |
| WO | 2005/080617 A1 | 9/2005 | |
| WO | 2006/093334 A1 | 9/2006 | |

OTHER PUBLICATIONS

International Searching Authority, International Search Report for PCT/JP2011/064558 dated Sep. 27, 2011.
State Intellectual Property Office of China, Communication dated Dec. 22, 2014 issued in corresponding Chinese application No. 201180040552.X.
Hu Zhengfei et al., Engineering Drawing and Computer Aided Design, Aug. 31, 2006, p. 122, Posts and Telegram Press, Beijing.
Guo Gengchen, Liquid Sintering Powder Metallurgical Material, Jan. 31, 2003, p. 1, Chemical Industry Press, Beijing.
International Searching Authority, Translation of the International Preliminary Report on Patentability issued in corresponding International Application No. PCT/JP2011/064558, dated Jan. 15, 2013.

* cited by examiner

*Primary Examiner* — Jessee Roe
(74) *Attorney, Agent, or Firm* — Sughrue Mion, PLLC

(57) ABSTRACT

A safe and industrially advantageous production method is disclosed for producing a rare earth-Mg—Ni based hydrogen storage alloy which realizes production of a nickel-hydrogen rechargeable battery having excellent cycle characteristics and a large capacity. The method is for producing a rare earth-Mg—Ni based hydrogen storage alloy including element A, Mg, and element B, wherein element A is composed of at least one element R selected from rare earth elements including Sc and Y, and optionally at least one element selected from Zr, Hf, and Ca, and element B is composed of Ni and optionally at least one element selected from elements other than element A and Mg. The method includes first step of mixing an alloy consisting of elements A and B and Mg metal and/or a Mg-containing alloy having a melting point not higher than the melting point of Mg metal, and second step of heat-treating a mixture obtained from first step for 0.5 to 240 hours at a temperature 5 to 250° C. lower than a melting point of the rare earth-Mg—Ni based hydrogen storage alloy to be obtained.

13 Claims, 2 Drawing Sheets
(2 of 2 Drawing Sheet(s) Filed in Color)

PROCESS FOR PRODUCTION OF (RARE EARTH)-MG-NI-BASED HYDROGEN STORAGE ALLOY

CROSS REFERENCE TO RELATED APPLICATIONS

This application is a National Stage of International Application No. PCT/JP2011/064558 filed Jun. 24, 2011, claiming priority based on Japanese Patent Application No. 2010-159124 filed Jun. 24, 2010, the contents of all of which are incorporated herein by reference in their entirety.

FIELD OF ART

The present invention relates to a nickel-hydrogen rechargeable battery, an anode for use in the battery, a rare earth-Mg—Ni based hydrogen storage alloy, and a method for producing the alloy.

BACKGROUND ART

A nickel-hydrogen rechargeable battery with an anode containing a hydrogen storage alloy has a higher energy density than a nickel-cadmium rechargeable battery, and places only a small burden on the environment due to absence of toxic Cd. Nickel-hydrogen rechargeable batteries are used in portable devices such as digital cameras and electric tools as well as in electric vehicles and hybrid electric vehicles. Various battery characteristics are desired depending on applications.

As an anode material for a nickel-hydrogen rechargeable battery, hydrogen storage alloys have been developed and used, such as those of $LaNi_5$ type containing $AB_5$ crystals as the main phase, those having a Laves phase as the main phase, and those having a BCC (body-centered cubic lattice) phase as the main phase.

Rare earth-Mg—Ni based hydrogen storage alloys have recently been put into practical use. Nickel-hydrogen rechargeable batteries employing this alloy are known to have a large capacity.

Patent Publication 1 is directed to a method for producing a rare earth-Mg—Ni based hydrogen storage alloy by melting, and discloses to inhibit evaporation of Mg by regulating the temperature of the rare earth-Mg—Ni-alloy melt and the pressure in the melting furnace to predetermined values.

Patent Publication 2 discloses a method for producing an alloy containing one or more of Mg, Ca, Li, Zn, Mn, and Sr by melting in a helium-containing gas atmosphere. In Examples, methods for preparing alloys such as $MgNi_2$ are disclosed.

Patent Publication 3 discloses a hydrogen storage alloy containing Mg and having a BCC lattice structure, and a method of producing the alloy by mechanical alloying.
Patent Publication 1: WO 2005/080617
Patent Publication 2: WO 2006/093334
Patent Publication 3: JP 2004-292838-A

SUMMARY OF THE INVENTION

According to the production method disclosed in Patent Publication 1, the temperature of the rare earth-Ni alloy melt upon addition of the Mg material is 1250 to 1400° C., which is far above 1090° C., the boiling point of Mg, and thus causes evaporation of Mg. According to the product ion method disclosed in Patent Publication 2, the melting point of, for example $MgNi_2$, is 1147° C., which causes the same problem. This makes the compositional control of the alloy difficult.

Further, the melting furnace is filled with Mg vapor, so that the situation in the furnace cannot be grasped, which is dangerous. Generation of Mg vapor is also accompanied by generation of dust, which may cause dust explosion. Thus melting at above the boiling point of Mg involves profound danger.

In view of these problems, mechanical alloying of Mg-containing alloys has been discussed as disclosed in Patent Publication 3. However, this process makes it difficult to obtain an alloy of homogeneous composition, in particular a low-Mg alloy of homogeneous composition.

It is an object of the present invention to provide a safe and industrially advantageous method for producing a rare earth-Mg—Ni based hydrogen storage alloy having a corrosion resistance which allows for excellent cycle characteristics, having hydrogen storage characteristics which allows for excellent initial activity and large capacity, and realizing a nickel-hydrogen rechargeable battery with excellent battery characteristics.

It is another object of the present invention to provide a rare earth-Mg—Ni based hydrogen storage alloy which has excellently uniformity of distribution of its constituent elements, in particular Mg, throughout the alloy, a corrosion resistance allowing for excellent cycle characteristics, and hydrogen storage characteristics allowing for excellent initial activity and large capacity, and which realizes a nickel-hydrogen rechargeable battery with excellent battery characteristics, as well as to provide an anode for a nickel-hydrogen rechargeable battery employing the alloy, and a nickel-hydrogen rechargeable battery having the anode.

According to the present invention, there is provided a method for producing a rare earth-Mg—Ni based hydrogen storage alloy comprising element A, Mg, and element B, wherein said element A consists of at least one element R selected from rare earth elements including Sc and Y, and optionally at least one element selected from Zr, Hf, and Ca, and said element B consists of Ni and optionally at least one element selected from elements other than element A and Mg, said method comprising:

first step of mixing an alloy consisting of elements A and B (sometimes referred to as an AB alloy hereinbelow) and Mg metal and/or a Mg-containing alloy having a melting point not higher than the melting point of Mg metal (sometimes referred to as a low-melting-point Mg-containing alloy hereinbelow), and second step of heat-treating a mixture obtained from said first step for 0.5 to 240 hours at a temperature 5 to 250° C. lower than a melting point of said rare earth-Mg—Ni based hydrogen storage alloy to be obtained (sometimes referred to as the present method hereinbelow).

According to the present invention, there is also provided a rare earth-Mg—Ni based hydrogen storage alloy prepared by the present method (sometimes referred to as the present alloy).

According to the present invention, there is further provided an anode for a nickel-hydrogen rechargeable battery containing the hydrogen storage alloy of the present invention, and a nickel-hydrogen rechargeable battery having the anode.

The present method, having the above structure, allows safe and industrially advantageous production of a rare earth-Mg—Ni based hydrogen storage alloy having a corrosion resistance that allows for excellent cycle characteristics, and hydrogen storage characteristics that allow for good initial activity and large capacity. In particular, the present method allows production of a rare earth-Mg—Ni based hydrogen storage alloy with uniform composition while eliminating the difficulty in compositional control of alloys and the risk of Mg dust explosion, both associated with Mg evaporation.

BRIEF DESCRIPTION OF THE DRAWINGS

The patent or application file contains at least one drawing executed in color. Copies of this patent or patent application publication with color drawings will be provided by the Office upon request and payment of the necessary fee.

PREFERRED EMBODIMENTS OF THE INVENTION

Figure 1:
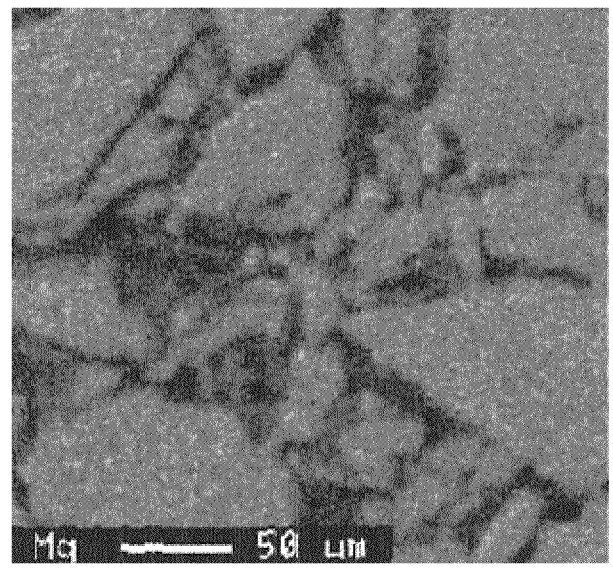
FIG. 1 is a copy of a Mg mapping image of the structure in section of the hydrogen storage alloy prepared in Example 1.

The present invention will now be explained in detail.

The present method is a method for producing a rare earth-Mg—Ni based hydrogen storage alloy containing element A, Mg, and element B.

Element A is composed of at least one element R selected from rare earth elements including Sc and Y, and optionally at least one element selected from Zr, Hf, and Ca.

The content of element R in element A is preferably 70 to 100 mol %, more preferably 95 to 100 mol %, and most preferably 99 to 100 mol %. The content of the optional element in element A is preferably 0 to 30 mol %, more preferably 0 to 5 mol %, most preferably 0 to 1 mol %.

Element R preferably includes at least one element selected from La, Ce, Nd, Pr, Sm, Gd, Y, Eu, and Yb. The optional element preferably includes Zr. La tends to lower the equilibrium pressure upon hydrogen absorption/desorption of the alloy to be obtained, whereas Nd, Pr, Sm, and Zr tend to increase the pressure.

Element B is composed of Ni, and optionally at least one element selected from elements other than element A and Mg.

At a low Ni content in element B, decrepitation tends to progress, whereas at a high Ni content, sufficient hydrogen storage capacity may not be achieved. The Ni content in element B is preferably 90 to 100 mol %, more preferably 93 to 98 mol %. The content of the optional element in element B is preferably 0 to 10 mol %, more preferably 2 to 7 mol %.

The optional element is optionally contained in element B when fine adjustment of the battery characteristics is required depending on the use of the battery. Specifically, the optional element may be at least one element selected from, for example, Al, Ti, V, Nb, Ta, Cr, Mo, W, Mn, Fe, Co, Cu, Zn, B, Ga, Sn, Sb, In, Si, C, and P, preferably at least one element selected from, for example, Al, Ti, Nb, Mo, W, Mn, Fe, Co, Cu, B, and Sn.

Al affects the corrosion resistance, and further improves the corrosion resistance when contained. However, at too large an Al content, sufficient hydrogen storage capacity may not be achieved, and Al segregation may cause insufficient corrosion resistance, so that the content of Al should be in the preferred range of the optional element mentioned above. Al also tends to lower the equilibrium pressure upon hydrogen absorption/desorption of the alloy. Fe, Cu, Sn, Ti, Nb, Mo, W, and B tend to suppress decrepitation or to inhibit elution of at least one element selected from Al, Co, and Mn into the electrolyte.

Mg makes great contribution to the hydrogen storage capacity. At a low Mg content, the hydrogen storage capacity is low, whereas at a high Mg content, sufficient corrosion resistance may not be achieved.

The present method may be applied to the production of rare earth-Mg—Ni based hydrogen storage alloys of various compositions, and allows production of the present alloy having desired characteristics such as hydrogen storage characteristics and corrosion resistance.

The ratio of the amount of element B by mole/(the amount of element A by mole+the amount of Mg by mole), which represents the compositional ratio of the rare earth-Mg—Ni based hydrogen storage alloy, is preferably in the range of 2.5 to 5.5. For an increased hydrogen storage capacity, the ratio is preferably in the range of 3.0 to 4.5. The ratio of the amount of Mg by mole/(the amount of element A by mole+the amount of Mg by mole) is preferably in the range of 0.01 to 0.30. When the ratio of the amount of element B by mole/(the amount of element A by mole+the amount of Mg by mole) is in the range of 3.0 to 4.5, the ratio of the amount of Mg by mole/(the amount of element A by mole+the amount of Mg by mole) is preferably in the range of 0.05 to 0.25, more preferably 0.10 to 0.20. When the ratio of the amount of element B by mole/(the amount of element A by mole+the amount of Mg by mole) is 3.0 to 4.5 and the ratio of the amount of Mg by mole/(the amount of element A by mole+the amount of Mg by mole) is 0.05 to 0.25, part of the atoms at the B-site of the unit lattice of the $AB_5$ crystal structure (element B in the present invention) is substituted with the atoms of the A-site (element A and/or Mg in the present invention), resulting in a kind of stacking fault. This causes the main phase of the obtained alloy to have one of the $CeNi_3$, $PuNi_3$, $Ce_2Ni_7$, $Gd_2Co_7$, $Ce_5Ni_{19}$, $Pr_5Co_{19}$, and the like crystal structures, which improves the hydrogen storage capacity compared to alloys having the main phase of the $AB_5$ crystal structure.

The rare earth-Mg—Ni based hydrogen storage alloy aimed at by the present method has a melting point of about 950 to 1090° C. Alloy production by casting generally requires melting at a temperature not less than 300° C. higher than the melting point, so that the process requires much higher temperature than 1090° C., the boiling point of Mg, causing evaporation of a large amount of Mg. In contrast, the present method includes the first and second steps to be discussed below, which may be performed at a temperature not higher than the boiling point of Mg. Thus evaporation of Mg may drastically be reduced compared to the conventional methods.

In the first step of the present method, an alloy composed of elements A and B, and Mg metal and/or a Mg-containing alloy having a melting point not higher than the melting point of Mg metal, are mixed. The AB alloy used here is preferably in the form of a powder for smooth diffusion and reaction of Mg in the subsequent heat treatment in the second step. The mean particle diameter (D50) of the powder is preferably 20 to 1000 μm, more preferably 20 to 400 μm, most preferably 20 to 100 μm.

The production method of the AB alloy used in the first step is not particularly limited, and may be a conventional method. For example, rapid cooling of an alloy melt, typically by strip casting using a single roll, twin rolls, or a disk, gas atomizing, or metal mold casting with a cooling rate lower than that of the rapid cooling of an alloy melt, may be employed.

Specifically, first, a raw material prepared by blending elements A and B to have a predetermined composition is provided. The raw material may be composed of elemental metals constituting elements A and B or one or more alloys containing the metals. Element R may be Mm (misch metal) containing La, Ce, Nd, Pr, Sm, and the like.

Next, the raw material blend is heated in an inert gas atmosphere to melt into an alloy melt, and when strip casting is employed, which is a rapid cooling method, the alloy melt is poured onto a water-cooled copper roll, rapidly cooled, and solidified into alloy flakes. In metal mold casting, an alloy melt obtained by the process discussed above is poured into a water-cooled copper mold, cooled, and solidified into an alloy ingot. An AB alloy obtained by rapid cooling of an alloy melt, which involves a higher cooling rate, is preferred since Mg is allowed to diffuse and react uniformly in an alloy having less segregation and uniform composition distribution.

The ratio of the amount of element B by mole/the amount of element A by mole, which represents the composition of the AB alloy, is preferably in the range of 3.00 to 6.00, more preferably 3.50 to 4.80, most preferably 3.70 to 4.70. When the ratio of the amount of element B by mole/the amount of element A by mole is in the range of 3.50 to 4.80, the alloy composed of elements A and B has a kind of stacking fault generated by substitution of part of the atoms at the B-site of the unit lattice of the $AB_5$ crystal structure with the atoms of the A-site. The presence of this stacking fault is believed to attribute to ready diffusion and reaction of Mg.

An as-cast AB alloy may often be composed largely of the $AB_5$ crystal phase. When such an alloy having the ratio of the amount of element B by mole/the amount of element A by mole in the range of 3.50 to 4.80 is used, diffusion and reaction of Mg are hard to proceed. In that case, it may be preferred to subject the alloy to heat treatment to reduce the $AB_5$ crystal phase.

The heat treatment may be carried out by a conventional method, such as cooling the as-cast AB alloy to room temperature followed by reheating, or using a system disclosed in JP 4224453 B, heating and holding the as-cast alloy prior to cooling to room temperature. For reduction of the $AB_5$ crystal phase, combination of the above-mentioned rapid cooling of the alloy melt and the heat treatment is most preferred. The heat treatment of the AB alloy is carried out usually at 900 to 1100° C. for 0.5 to 24 hours. The content of the $AB_5$ crystal phase in the AB alloy is preferably not higher than 60%, more preferably not higher than 30%. At a ratio of the amount of element B by mole/the amount of element A by mole in the range of 3.50 to 4.80, the content of the $AB_5$ crystal phase is set to the value IA/IB×100(%), wherein IA/IB is a ratio of the intensity of the highest peak appearing in $2\theta=29.5$ to 31° (IA) to the intensity of the highest peak appearing in $2\theta=42$ to 43° (IB) determined through the X-ray diffraction of the AB alloy powder under the following conditions:
radiation source: CuKα; tube voltage: 40 kV; current: 300 mA; measured range 2θ: 20 to 50°; scan axis: 2θ/θ; scan step: 0.02°; scan speed: 2°/min; divergence slit: ½°; receiving slit: 0.15 mm.

The Mg metal and/or the low-melting-point Mg-containing alloy used in the first step is preferably in the form of a powder for efficient diffusion in and reaction with the AB alloy. The mean particle diameter (D50) of the powder is preferably 20 to 2000 μm, more preferably 20 to 1500 μm, most preferably 20 to 200 μm.

The low-melting-point Mg-containing alloy is preferably composed of Mg metal and element B and/or element R. The melting point of the Mg-containing alloy is preferably as low as possible for preventing evaporation of Mg in the subsequent heat treatment in the second step. Element B to be combined with Mg metal may be, for example, at least one element selected from Al, Cu, Zn, Ga, Sn, and In. Particularly preferred are Mg—Al, Mg—In, Mg—Zn, and the like alloys. Element R to be combined with Mg metal may be, for example, at least one element selected from La, Ce, Pr, Nd, Sm, Gd, Eu, Y, and Yb.

The production method and the alloy form of the low-melting-point Mg-containing alloy may be as discussed above with regard to the AB alloy.

Since, in the present method, the heat treatment in the second step to be discussed later is carried out at a relatively low temperature, i.e., at a temperature 5 to 250° C. lower than the melting point of the rare earth-Mg—Ni based hydrogen storage alloy to be obtained, evaporation of the components such as Mg is not significant. Nevertheless, the amount to be used and the composition of the AB alloy, Mg metal and/or the low-melting-point Mg-containing alloy may suitably be decided, strictly, taking the yield of each component into account, so that an alloy of the desired composition may be obtained.

As discussed above, use of the low-melting-point Mg-containing alloy is acceptable. However, in view of the difference in speed of diffusion into and reaction with the AB alloy between Mg and the elements other than Mg in the low-melting-point Mg-containing alloy, for obtaining an alloy of uniform composition while avoiding evaporation of the elements including Mg, the reaction will be complicated when the low-melting-point Mg-containing alloy is used. Thus use of only Mg metal is particularly preferred.

In the first step, the AB alloy and Mg metal and/or the low-melting-point Mg-containing alloy are mixed preferably into a uniform mixture for efficient diffusion and reaction by the heat treatment in the subsequent second step. As mentioned above, the AB alloy and Mg metal and/or the low-melting-point Mg-containing alloy are preferably in the form of powders. The manner of mixing is not particularly limited as long as the powders are mixed into a uniform mixture and, for example, a rotary mixer such as double-corn or V-type rotary mixer, or a stirring mixer such as those having vanes or screws, may be used. A pulverizer such as a ball mill or an attritor mill may also be used to pulverize and mix the AB alloy and Mg metal and/or the low-melting-point Mg-containing alloy. In order to improve the contact state between the AB alloy and Mg metal and/or the low-melting-point Mg-containing alloy, a binder may be used upon mixing, or the obtained mixture may be pressed.

In the second step of the present method, the mixture obtained from the first step is heat-treated for 0.5 to 240 hours at a temperature 5 to 250° C. lower than the melting point of the rare earth-Mg—Ni based hydrogen storage alloy to be obtained. This heat treatment may be carried out in a conventional heat-treatment furnace in which the atmosphere may be controlled. The heat treatment may be carried out with the mixture being mixed. For example, a rotary mixer such as a rotary kiln may be used. During the heat treatment, Mg metal and/or the low-melting-point Mg-containing alloy is diffused into and reacted with the AB alloy, resulting in a rare earth-Mg—Ni based hydrogen storage alloy. The heat treatment is preferably carried out at such temperature and for such duration that the evaporation of Mg is suppressed and the diffusion and reaction easily proceed. Specifically, the temperature of the heat treatment is preferably at a temperature 20 to 120° C. lower than the melting point of the rare earth-Mg—Ni based hydrogen storage alloy to be obtained. The duration of the heat treatment is preferably 1 to 24 hours.

Heat treatment at a temperature higher than the temperature 5° C. lower than the melting point of the rare earth-Mg—Ni based hydrogen storage alloy to be obtained will cause decomposition of the crystal phases of the AB alloy, failing to obtain an alloy of uniform composition. Heat treatment at a temperature lower than the temperature 250° C. lower than the melting point of the rare earth-Mg—Ni based hydrogen storage alloy to be obtained will disturb sufficient diffusion and reaction of Mg, failing to obtain an alloy of uniform composition. Since Mg is prone to oxidation, the heat treatment is preferably carried out in vacuo or in an insert gas atmosphere. More preferred is an insert gas atmosphere under pressure. In this case, not only oxidation but also evaporation of Mg is prevented.

The heat treatment in the second step may be carried out in two or more separate steps, for example, by holding the mixture in a temperature range slightly above the melting point of the Mg metal and/or the low-melting-point Mg-containing alloy, raising the temperature, and holding the mixture at a temperature 5 to 250° C. lower than the melting point of the rare earth-Mg—Ni based hydrogen storage alloy to be obtained. In this way, Mg metal and/or the low-melting-point Mg-containing alloy may be diffused in and reacted with the AB alloy more uniformly.

In case part of the alloy after the heat treatment is aggregated, or has a powder particle size larger than the size suitable for an anode material for a nickel-hydrogen rechargeable battery, a third step of loosening or pulverizing the heat-treated rare earth-Mg—Ni based hydrogen storage alloy, subsequent to the heat treatment in the second step. Generally, the mean particle diameter (D50) after the loosening or pulverization is 10 to 100 µm, preferably 30 to 80 µm. The loosening or the pulverization may be carried out in a conventional pulverizer such as a feather mill, hammer mill, ball mill, or attritor.

According to the present method, by suitable selection of the size and shape of the AB alloy, Mg metal and/or the low-melting-point Mg-containing alloy used in the first step, and the conditions of the heat treatment in the second step, an alloy containing Mg uniformly distributed throughout the alloy may be obtained. With Mg uniformly distributed throughout the alloy, the alloy is given a hydrogen storage capacity comparable to a conventional rare earth-Mg—Ni based hydrogen storage alloy, and excellent corrosion resistance. The alloy is also given more excellent initial activity compared to a conventional rare earth-Mg—Ni based hydrogen storage alloy.

Similarly, by suitable selection of various conditions, a rare earth-Mg—Ni based hydrogen storage alloy having a Mg-concentration gradient may be given, wherein the Mg concentration is higher in the surface layer of the alloy and lower in the central part. A rare earth-Mg—Ni based hydrogen storage alloy having such a concentration gradient has a large hydrogen storage capacity and excellent corrosion resistance even at a relatively low Mg content of the entire alloy. This is believed to be because the surface layer with high Mg content acts as a gateway for smooth hydrogen absorption/desorption to facilitate diffusion of hydrogen into the central part with low Mg content. It is assumed that the surface layer with high Mg content has any of $Ce_2Ni_3$, $PuNi_3$, $Ce_2Ni_7$, $Gd_2Co_7$, $Ce_5Ni_{19}$, $Pr_5Co_{19}$, and the like crystal structures, which is formed by substituting part of the atoms at the B-site of the unit lattice of the $AB_5$ crystal structure (element B in the present invention) with the atoms of the A-site (element A and/or Mg in the present invention) as discussed above. In the production of an alloy having the Mg-concentration gradient, the amount of Mg used may be reduced, so that the compositional control of the alloy is made easier and the alloy production becomes safer, which provides considerable advantage. Even with the Mg concentration at grade, the compositions of the alloys produced by the present method are uniform among the alloys.

The anode for a nickel-hydrogen rechargeable battery according to the present invention contains the present alloy produced as discussed above. The mean particle diameter (D50) of the present alloy is preferably 10 to 100 µm, more preferably 30 to 80 µm, as discussed above. Incidentally, the present alloy may be subjected to a conventional treatment, such as surface coating, for example, by plating or with a high polymer, or surface treatment with, for example, an acid or alkaline solution, prior to use depending on the desired characteristics.

The anode for a nickel-hydrogen rechargeable battery according to the present invention may contain a mixture of the present alloy and one or more other hydrogen storage alloys, for example, a La—$Ni_5$ based hydrogen storage alloy.

The content of the present alloy in the anode for a nickel-hydrogen rechargeable battery of the present invention is preferably not less than 80 mass %, more preferably not less than 95 mass %, of the total amount of the materials constituting the anode such as an electrically conductive material and a binder, exclusive of the collector.

The electrically conductive material may be a conventional one and may be, for example, carbon black such as acetylene black and furnace black, a carbonaceous material such as graphite, copper, nickel, or cobalt.

The binder may be a conventional one and may be, for example, carboxymethyl cellulose, polyvinyl alcohol, polyvinylbutyral, polyvinylpyrrolidone, polyethylene oxide, polytetrafluoroethylene (PTFE), ethylene-tetrafluoride-propylene hexafluoride copolymer (FEP).

The collector may be made of, for example, punched metal or foam metal. An anode for a nickel-hydrogen rechargeable battery is generally prepared by a so-called paste method, thus a punched metal is used. Such a paste-type anode may be prepared by mixing the present alloy, the binder mentioned above, and optionally an electrically conductive material, an antioxidant, a surfactant, a thickener and/or the like, with water as a solvent into a paste, applying the paste to a collector, packing, drying, roller-pressing, and the like steps.

The anode for a nickel-hydrogen rechargeable battery of the present invention may have a water-repellent layer or an electrically conductive layer formed on its surface as desired. Such a layer may be formed by a conventional method. For example, the former may be formed by application of a fluororesin dispersion or the like followed by drying, whereas the latter by plating or the like.

The nickel-hydrogen rechargeable battery according to the present invention has the anode for a nickel-hydrogen rechargeable battery of the present invention. The remaining structures may be conventional.

The nickel-hydrogen rechargeable battery of the present invention may be in a variety of shapes, including a cylinder, a laminate, or a coin. In any shape, a nickel-hydrogen rechargeable battery is fabricated by placing a series of electrodes prepared by laminating an anode, a separator, and a cathode, in a stainless can or the like. In the case of a cylindrical shape, the can generally acts as an anode terminal, so that the anode is connected to the anode terminal by rolling the series of electrodes into a roll with the anode outside, and inserting the roll in the can. The cathode is generally connected to a cathode terminal with a lead wire.

The separator may be made of, for example, a non-woven fabric of polymer fibers such as of nylon, polypropylene, or polyethylene, or a porous polymer film such as of polyethylene or polypropylene.

The cathode contains a nickel oxide and may be, for example, a non-sintered nickel electrode. A non-sintered nickel electrode is prepared by mixing nickel hydroxide, a binder, and optionally cobalt hydroxide, cobalt monoxide, and/or cobalt metal, with water as a solvent into a paste, applying the paste to a collector of, for example, foam metal, packing, drying, roller-pressing, and the like steps.

In the container in which the series of electrodes has been placed, a 6 to 8N potassium hydroxide solution as an alkaline electrolyte is introduced. An alkaline electrolyte containing lithium hydroxide or sodium hydroxide may also be used. The container is usually equipped with a gasket for sealing the battery, and a safety valve which operates upon pressure buildup in the battery.

EXAMPLES

The present invention will now be explained in detail with reference to Examples and Comparative Examples, which do not intend to limit the present invention.

Example 1

Starting materials other than Mg were measured out, and melted in a high-frequency melting furnace in an argon gas atmosphere into an alloy melt. The alloy melt was rapidly cooled and solidified by strip casting with a single-roll casting system having a water-cooled copper roll at a pouring temperature of 1400° C., into flakes having an average thickness of 0.4 mm. The obtained flakes were preliminarily pulverized in a ball mill into an alloy having a mean particle diameter (D50) of 75 μm. The composition of the obtained alloy was analyzed by ICP, and found to be $La_{0.60}Sm_{0.16}Zr_{0.04}Ni_{3.45}Al_{0.10}$. The value of IA/IB=100 of the alloy determined by X-ray diffraction under the above-mentioned conditions was 50%.

The alloy obtained above was thoroughly mixed with Mg metal powder having a mean particle diameter (D50) of 110 μm in a mortar. The obtained mixture was held in an argon gas atmosphere at 700° C. for 30 minutes, and then at an elevated temperature of 920° C. for 24 hours. The composition of the obtained alloy was analyzed by ICP and found to be $La_{0.60}Sm_{0.16}Zr_{0.04}Mg_{0.20}Ni_{3.45}Al_{0.10}$. The yield of Mg was 99.6%. The melting point of the obtained alloy was about 1000° C.

The heat-treated hydrogen storage alloy powder was observed with an EPMA (manufactured by JEOL LTD., trade name JXA8800). The Mg elemental mapping image is shown in FIG. 1. It was observed that Mg was uniformly distributed throughout the alloy.

[Characteristics Evaluation Tests]

The battery characteristics of the obtained hydrogen storage alloy were measured as follows. The results of evaluations of the battery characteristics are shown in Table 1.

<Maximum Discharge Capacity>

The obtained hydrogen storage alloy was pulverized in a ball mill into an alloy powder having a mean particle diameter (D50) of about 60 μm. 0.15 g of the alloy powder and 0.45 g of carbonyl nickel powder were thoroughly mixed in a mortar, and the resulting mixture was pressed at 2000 kgf/cm² into a pellet of 10 mm in diameter. The pellet was held between two sheets of nickel mesh, and the periphery of the mesh sheets was spot-welded to press-contact the mesh sheets. Further, a nickel lead wire was spot-welded to the mesh sheets, to thereby prepare an anode. The obtained anode and a sintered nickel electrode as a counter electrode were immersed in a 8N aqueous KOH solution, and subjected to charge/discharge cycle test at 25° C.

The charge/discharge was carried out using a charge/discharge device (manufactured by KEISOKUKI CENTER CO., LTD., trade name BS2500-05R1) by repeating the cycle of charging at a current of 150 mA per 1 g of the hydrogen storage alloy for 170 minutes, taking a break for 10 minutes, and discharging to a mercury oxide electrode at a current of 150 mA per 1 g of the hydrogen storage alloy to −0.7 V. The maximum discharge capacity was taken as the maximum discharge capacity of the hydrogen storage alloy.

<Initial Activity>

The initial activity was defined from the above-mentioned maximum discharge capacity and the discharge capacity at the third cycle, as follows:

Initial activity=(discharge capacity at 3rd cycle/maximum discharge capacity)×100

<Cycle Characteristics>

The cycle characteristics were defined from the above-mentioned maximum discharge capacity and the discharge capacity at the 100th cycle, as follows:

Cycle characteristics=(discharge capacity at 100th cycle/maximum discharge capacity)×100

Example 2

An alloy without Mg was prepared in the same way as in Example 1 except that the composition of the starting materials was changed. The composition of the obtained alloy was analyzed by ICP and found to be $La_{0.72}Nd_{0.10}Sm_{0.06}Ni_{3.38}Al_{0.10}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 940° C. for 12 hours. The composition of the obtained alloy was analyzed by ICP and found to be $La_{0.72}Nd_{0.10}Sm_{0.06}Mg_{0.12}Ni_{3.38}Al_{0.10}$. The yield of Mg was 99.5% The melting point of the obtained alloy was about 990° C.

Figure 2:
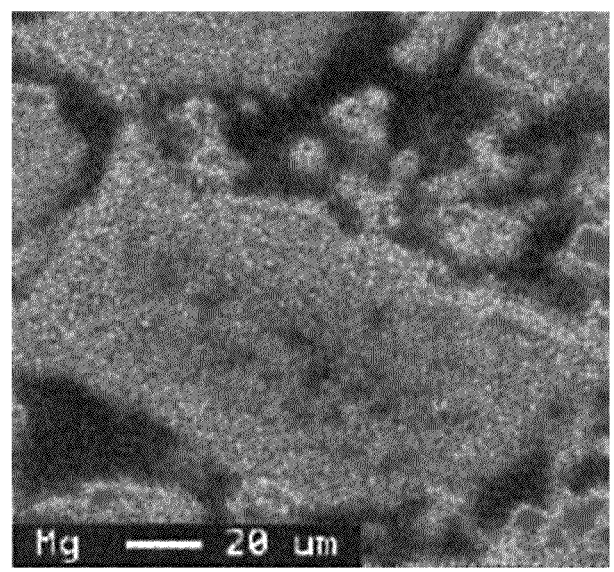
FIG. 2 is a copy of a Mg mapping image of the structure in section of the hydrogen storage alloy prepared in Example 2.

The Mg elemental mapping image of this alloy is shown in FIG. 2. It is seen that Mg is present more in the surface layer than in the center part. The value of IA/IB×100 of the alloy without Mg and the results of evaluations of the battery characteristics determined in the same way as in Example 1 are shown in Table 1.

Example 3

An alloy without Mg was prepared in the same way as in Example 1 except that the composition of the starting materials was changed. The composition of the obtained alloy was analyzed by ICP and found to be $La_{0.55}Ce_{0.05}Sm_{0.20}Ni_{2.85}Al_{0.15}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 940° C. for 12 hours. The composition of the obtained alloy was analyzed by ICP and found to be $La_{0.55}Ce_{0.05}Sm_{0.20}Mg_{0.20}Ni_{2.85}Al_{0.15}$. The yield of Mg was 100%. The melting point of the obtained alloy was about 950° C.

Observation with an EPMA revealed that Mg was uniformly distributed throughout the alloy. The value of IA/IB×

100 of the alloy without Mg and the results of evaluations of the battery characteristics determined in the same way as in Example 1 are shown in Table 1.

Example 4

An alloy without Mg was prepared in the same way as in Example 1 except that the composition of the starting materials was changed. The composition of the obtained alloy was analyzed by ICP and found to be $La_{0.85}Ni_{4.80}Al_{0.20}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 900° C. for 24 hours. The composition of the obtained alloy was analyzed by ICP and found to be $La_{0.85}Mg_{0.15}Ni_{4.80}Al_{0.20}$. The yield of Mg was 99.5%. The melting point of the obtained alloy was about 1000° C.

Observation with an EPMA revealed that Mg was present more in the surface layer than in the center part. The results of evaluations of the battery characteristics determined in the same way as in Example 1 are shown in Table 1.

Example 5

An alloy without Mg was prepared in the same way as in Example 1 except that the composition of the starting materials was changed. The composition of the obtained alloy was analyzed by ICP and found to be $La_{0.85}Ni_{3.60}Al_{0.20}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 920° C. for 16 hours. The composition of the obtained alloy was analyzed by ICP and found to be $La_{0.85}Mg_{0.15}Ni_{3.60}Al_{0.20}$. The yield of Mg was 99.5%. The melting point of the obtained alloy was about 960° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Example 6

The alloy without Mg obtained in Example 5 was thoroughly mixed with Mg metal powder having a mean particle diameter (D50) of 110 μm in a mortar. The resulting mixture was held in an argon gas atmosphere at 700° C. for 30 minutes, and then at an elevated temperature of 910° C. for 6 hours. The composition of the obtained alloy was analyzed by ICP and found to be $La_{0.85}Mg_{0.15}Ni_{3.60}Al_{0.20}$. The yield of Mg was 99.5%. The melting point of the obtained alloy was about 960° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 7

An alloy without Mg was prepared in the same way as in Example 1 except that the composition of the starting materials was changed. The composition of the obtained alloy was analyzed by ICP and found to be $La_{0.49}Nd_{0.15}Pr_{0.15}Hf_{0.01}Ni_{3.37}Al_{0.18}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 920° C. for 12 hours. The composition of the obtained alloy was analyzed by ICP and found to be $La_{0.49}Nd_{0.15}Pr_{0.15}Hf_{0.01}Mg_{0.16}Ni_{3.37}Al_{0.18}$. The yield of Mg was 99.7%. The melting point of the obtained alloy was about 1020° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Example 8

An alloy without Mg was prepared in the same way as in Example 1 except that the composition of the starting materials was changed. The composition of the obtained alloy was analyzed by ICP and found to be $La_{0.78}Y_{0.02}Ni_{3.45}Al_{0.20}Mn_{0.07}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 900° C. for 16 hours. The composition of the obtained alloy was analyzed by ICP and found to be $La_{0.78}Y_{0.02}Mg_{0.20}Ni_{3.45}Al_{0.20}Mn_{0.07}$. The yield of Mg was 99.5%. The melting point of the obtained alloy was about 945° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 9

An alloy without Mg was prepared in the same way as in Example 1 except that the composition of the starting materials was changed. The composition of the obtained alloy was analyzed by ICP and found to be $La_{0.55}Pr_{0.06}Nd_{0.19}Ni_{3.30}Al_{0.15}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 970° C. for 12 hours. The composition of the obtained alloy was analyzed by ICP and found to be $La_{0.55}Pr_{0.06}Nd_{0.19}Mg_{0.20}Ni_{3.30}Al_{0.15}$. The yield of Mg was 99.2% The melting point of the obtained alloy was about 1010° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Example 10

The alloy without Mg obtained in Example 9 was thoroughly mixed with Mg metal powder having a mean particle diameter (D50) of 110 μm in a mortar. The resulting mixture was held in an argon gas atmosphere at 700° C. for 30 minutes, and then at an elevated temperature of 950° C. for 12 hours. The composition of the obtained alloy was analyzed by ICP and found to be $La_{0.55}Pr_{0.06}Nd_{0.19}Mg_{0.20}Ni_{3.30}Al_{0.15}$. The yield of Mg was 99.5%. The melting point of the obtained alloy was about 1010° C.

Observation with an EPMA revealed that Mg was uniformly distributed throughout the alloy. The value of IA/IB× 100 of the alloy without Mg and the results of evaluations of the battery characteristics determined in the same way as in Example 1 are shown in Table 1.

Example 11

An alloy without Mg was prepared in the same way as in Example 1 except that the composition of the starting materials was changed. The composition of the obtained alloy was analyzed by ICP and found to be $La_{0.60}Pr_{0.25}Ni_{3.50}Al_{0.15}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 930° C. for 6 hours. The composition of the obtained alloy was analyzed by ICP and found to be $La_{0.60}Pr_{0.25}Mg_{0.15}Ni_{3.50}Al_{0.15}$. The yield of Mg was 99.4%. The melting point of the obtained alloy was about 980° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 12

An alloy without Mg was prepared in the same way as in Example 1 except that the composition of the starting materials was changed. The composition of the obtained alloy was analyzed by ICP and found to be $La_{0.70}Pr_{0.15}Ni_{3.55}Al_{0.15}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 930° C. for 16 hours. The composition of the obtained alloy was analyzed by ICP and found to be $La_{0.70}Pr_{0.15}Mg_{0.15}Ni_{3.55}Al_{0.15}$. The yield of Mg was 99.6%. The melting point of the obtained alloy was about 970° C.

Observation with an EPMA revealed that Mg was uniformly distributed throughout the alloy. The value of IA/IB× 100 of the alloy without Mg and the results of evaluations of the battery characteristics determined in the same way as in Example 1 are shown in Table 1.

Example 13

An alloy without Mg was prepared in the same way as in Example 1 except that the composition of the starting materials was changed. The composition of the obtained alloy was analyzed by ICP and found to be $La_{0.80}Pr_{0.10}Ni_{3.50}Al_{0.17}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 910° C. for 12 hours. The composition of the obtained alloy was analyzed by ICP and found to be $La_{0.80}Pr_{0.10}Mg_{0.10}Ni_{3.50}Al_{0.17}$. The yield of Mg was 99.8%. The melting point of the obtained alloy was about 955° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 14

An alloy without Mg was prepared in the same way as in Example 1 except that the composition of the starting materials was changed. The composition of the obtained alloy was analyzed by ICP and found to be $La_{0.85}Pr_{0.10}Ni_{3.50}Al_{0.17}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 890° C. for 20 hours. The composition of the obtained alloy was analyzed by ICP and found to be $La_{0.85}Pr_{0.10}Mg_{0.05}Ni_{3.50}Al_{0.17}$. The yield of Mg was 100%. The melting point of the obtained alloy was about 950° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 15

An alloy without Mg was prepared in the same way as in Example 1 except that the composition of the starting materials was changed. The composition of the obtained alloy was analyzed by ICP and found to be $La_{9.69}Pr_{0.25}Ni_{3.50}Al_{0.15}$.

The obtained alloy was thoroughly mixed with $Mg_9Al$ powder (melting point at about 600° C.) having a mean particle diameter (D50) of 150 μm in a mortar. The resulting mixture was held in an argon gas atmosphere at 700° C. for 30 minutes, and then at an elevated temperature of 930° C. for 6 hours. The composition of the obtained alloy was analyzed by ICP and found to be $La_{0.60}Pr_{0.25}Mg_{0.15}Ni_{3.50}Al_{0.17}$. The yield of Mg was 99.2%. The melting point of the obtained alloy was about 1005° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 16

An alloy without Mg was prepared in the same way as in Example 1 except that the composition of the starting materials was changed. The composition of the obtained alloy was analyzed by ICP and found to be $Pr_{0.35}Nd_{0.50}Ni_{3.40}Al_{0.15}$.

The obtained alloy was thoroughly mixed with Mg metal powder having a mean particle diameter (D50) of 110 μm in a mortar. The resulting mixture was held in an argon gas atmosphere at 700° C. for 30 minutes, and then at an elevated temperature of 1030° C. for 16 hours. The composition of the obtained alloy was analyzed by ICP and found to be $Pr_{0.35}Nd_{0.50}Mg_{0.15}Ni_{3.40}Al_{0.15}$. The yield of Mg was 99.5%. The melting point of the obtained alloy was about 1080° C.

Observation with an EPMA revealed that Mg was uniformly distributed throughout the alloy. The value of IA/IB× 100 of the alloy without Mg and the results of evaluations of the battery characteristics determined in the same way as in Example 1 are shown in Table 1.

Example 17

An alloy without Mg was prepared in the same way as in Example 1 except that the composition of the starting materials was changed. The composition of the obtained alloy was analyzed by ICP and found to be $La_{0.70}Pr_{0.15}Ni_{3.40}Co_{0.15}Al_{0.15}$.

The obtained alloy was thoroughly mixed with Mg metal powder having a mean particle diameter (D50) of 110 µm in a mortar. The resulting mixture was held in an argon gas atmosphere at 700° C. for 30 minutes, and then at an elevated temperature of 920° C. for 12 hours. The composition of the obtained alloy was analyzed by ICP and found to be $La_{0.70}Pr_{0.15}Mg_{0.15}Ni_{3.40}Co_{0.15}Al_{0.15}$. The yield of Mg was 99.7% The melting point of the obtained alloy was about 965° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Example 18

The alloy without Mg obtained in Example 5 was thoroughly mixed with Mg metal powder having a mean particle diameter (D50) of 110 µm in a mortar. The resulting mixture was held in an argon gas atmosphere at 700° C. for 30 minutes, and then at an elevated temperature of 840° C. for 12 hours. The composition of the obtained alloy was analyzed by ICP and found to be $La_{0.85}Mg_{0.15}Ni_{3.60}Al_{0.20}$. The yield of Mg was 99.6%. The melting point of the obtained alloy was about 960° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 19

The alloy without Mg obtained in Example 2 was subjected to heat treatment at 900° C. for 6 hours.

The obtained alloy was thoroughly mixed with Mg metal powder having a mean particle diameter (D50) of 110 µm in a mortar. The resulting mixture was held in an argon gas atmosphere at 700° C. for 30 minutes, and then at an elevated temperature of 960° C. for 12 hours. The composition of the obtained alloy was analyzed by ICP and found to be $La_{0.72}Nd_{0.10}Sm_{0.06}Mg_{0.12}Ni_{3.38}Al_{0.10}$. The yield of Mg was 99.5% The melting point of the obtained alloy was about 990° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Example 20

Starting materials other than Mg were measured out, and melted in a high-frequency melting furnace in an argon gas atmosphere into an alloy melt. The alloy melt was rapidly cooled and solidified by strip casting with a single-roll casting system having a water-cooled copper roll at a pouring temperature of 1400° C., and subjected to heat treatment in a heating drum in an argon gas atmosphere at 900° C. for 10 minutes to obtain flakes having an average thickness of 0.4 mm. The obtained flakes were preliminarily pulverized in a ball mill into an alloy having a mean particle diameter (D50) of 75 µm. The composition of the obtained alloy was analyzed by ICP and found to be $La_{0.72}Nd_{0.10}Sm_{0.06}Ni_{3.38}Al_{0.10}$.

The alloy obtained above was thoroughly mixed with Mg metal powder having a mean particle diameter (D50) of 110 µm in a mortar. The obtained mixture was held in an argon gas atmosphere at 700° C. for 30 minutes, and then at an elevated temperature of 940° C. for 12 hours. The composition of the obtained alloy was analyzed by ICP and found to be $La_{0.72}Nd_{0.10}Sm_{0.06}Mg_{0.12}Ni_{3.38}Al_{0.10}$. The yield of Mg was 99.6%. The melting point of the obtained alloy was about 990° C.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Example 21

Starting materials other than Mg were measured out, and melted in a high-frequency melting furnace in an argon gas atmosphere into an alloy melt. The alloy melt was casted into a water-cooled copper mold having a thickness of 40 mm at a pouring temperature of 1400° C. to obtain an ingot. The obtained ingot was preliminarily pulverized in a ball mill into an alloy having a mean particle diameter (D50) of 75 µm. The composition of the obtained alloy was analyzed by ICP and found to be $La_{0.70}Pr_{0.15}Ni_{3.55}Al_{0.15}$.

The alloy obtained above was thoroughly mixed with Mg metal powder having a mean particle diameter (D50) of 110 µm in a mortar. The obtained mixture was held in an argon gas atmosphere at 700° C. for 30 minutes, and then at an elevated temperature of 930° C. for 16 hours. The composition of the obtained alloy was analyzed by ICP and found to be $La_{0.70}Pr_{0.15}Mg_{0.15}Ni_{3.55}Al_{0.15}$. The yield of Mg was 99.6%. The melting point of the obtained alloy was about 970° C.

Observation with an EPMA revealed that Mg was uniformly distributed throughout the alloy. The value of IA/IB×100 of the alloy without Mg and the results of evaluations of the battery characteristics determined in the same way as in Example 1 are shown in Table 1.

Comparative Example 1

In order to obtain an alloy of the same composition as the alloy of Example 1, all the starting materials including Mg metal were blended altogether, and obtained flakes by strip casting in the same way as in Example 1. The obtained flakes were subjected to heat treatment in an argon atmosphere at 950° C. for 6 hours. The composition of the obtained alloy was analyzed by ICP and found to be $La_{0.60}Sm_{0.16}Zr_{0.04}Mg_{0.20}Ni_{3.45}Al_{0.10}$. The yield of Mg was 80%.

Observation with an EPMA revealed that Mg was uniformly distributed throughout the alloy. The results of evaluations of the battery characteristics of the alloy determined in the same way as in Example 1 are shown in Table 1.

Comparative Example 2

An alloy was prepared in the same way as in Comparative Example 1 except that the composition of the starting materials was changed so as to obtain an alloy of the same composition as the alloy of Example 2. The composition of the obtained alloy was analyzed by ICP and found to be $La_{0.72}Nd_{0.10}Sm_{0.06}Mg_{0.12}Ni_{3.38}Al_{0.10}$. The yield of Mg was 72%.

Observation with an EPMA revealed that Mg was uniformly distributed throughout the alloy. The results of evaluations of the battery characteristics of the alloy determined in the same way as in Example 1 are shown in Table 1.

Comparative Example 3

An alloy without Mg was prepared in the same way as in Example 1 except that the composition of the starting materials was changed. The composition of the obtained alloy was analyzed by ICP and found to be $La_{0.60}Sm_{0.16}Zr_{0.04}Ni_{3.35}Al_{0.10}$.

The obtained alloy was thoroughly mixed with $Mg_2Ni$ powder (melting point at about 820° C.) having a mean particle diameter of 110 μm, in place of the Mg metal powder, in a mortar. The resulting mixture was held in an argon gas atmosphere at 870° C. for 30 minutes, and then at an elevated temperature of 970° C. for 24 hours. The composition of the obtained alloy was analyzed by ICP and found to be $La_{0.60}Sm_{0.16}Zr_{0.04}Mg_{0.20}Ni_{3.45}Al_{0.10}$.

Figure 3:
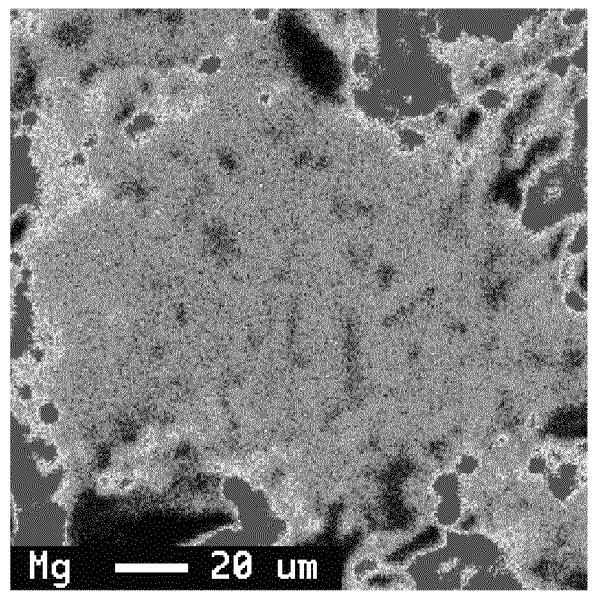
FIG. 3 is a copy of a Mg mapping image of the structure in section of the hydrogen storage alloy prepared in Comparative Example 3.
Figure 4:
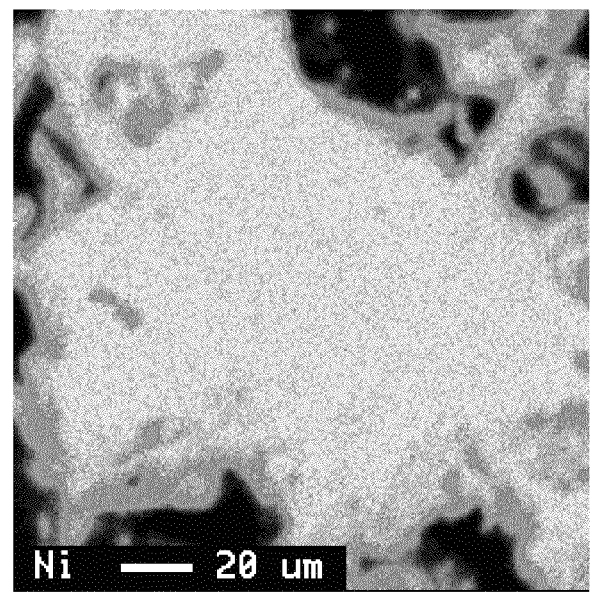
FIG. 4 is a copy of a Ni mapping image of the structure in section of the hydrogen storage alloy prepared in Comparative Example 3.

The Mg elemental mapping image of this alloy is shown in FIG. 3, and the Ni elemental mapping image in FIG. 4. Mg and Ni were hardly diffused in the alloy. It was demonstrated that, when an Mg-containing alloy having a melting point higher than 650° C., which is the melting point of Mg, an alloy having a uniform composition was not obtained. The value of IA/IB×100 of the alloy without Mg and the results of evaluations of the battery characteristics determined in the same way as in Example 1 are shown in Table 1.

Comparative Example 4

An alloy was prepared in the same way as in Comparative Example 3, except that the mixture of the alloy without Mg and the $Mg_2Ni$ powder was subjected to heat treatment by holding the mixture at 870° C. for 30 minutes, and then at an elevated temperature of 1000° C. for 24 hours. The composition of the obtained alloy was analyzed by ICP and found to be $La_{0.60}Sm_{0.16}Zr_{0.04}Mg_{0.20}Ni_{3.45}Al_{0.10}$.

It was observed that the obtained alloy exhibited advanced sintering among the particles compared to the alloy of Comparative Example 3, but observation with an EPMA revealed that Mg and Ni were hardly diffused in the alloy as in the alloy of Comparative Example 3. The value of IA/IB×100 of the alloy without Mg and the results of evaluations of the battery characteristics determined in the same way as in Example 1 are shown in Table 1.

Comparative Example 5

An alloy was prepared in the same way as in Example 8, except that the mixture of the alloy without Mg and the Mg metal powder was subjected to heat treatment by holding the mixture at 700° C. for 30 minutes, and then at an elevated temperature of 945° C. for 12 hours. The composition of the obtained alloy was analyzed by ICP and found to be $La_{0.78}Y_{0.02}Mg_{0.20}Ni_{3.45}Al_{0.20}Mn_{0.07}$.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

Comparative Example 6

An alloy was prepared in the same way as in Example 9, except that the mixture of the alloy without Mg and the Mg metal powder was subjected to heat treatment by holding the mixture at 700° C. for 24 hours. The composition of the obtained alloy was analyzed by ICP and found to be $La_{0.55}Pr_{0.06}Nd_{0.19}Mg_{0.20}Ni_{3.30}Al_{0.15}$.

Observation with an EPMA revealed that Mg was present more in the surface layer than in the center part. The value of IA/IB×100 of the alloy without Mg and the results of evaluations of the battery characteristics determined in the same way as in Example 1 are shown in Table 1.

TABLE 1

| | Alloy composition | Percentage of $AB_5$ crystal phase in AB alloy (%) | Maximum discharge capacity (mAh/g) | Initial activity (%) | Cycle characteristics (%) | Distribution of Mg | Yield of Mg (%) |
|---|---|---|---|---|---|---|---|
| Ex. 1 | $La_{0.60}Sm_{0.16}Zr_{0.04}Mg_{0.20}Ni_{3.45}Al_{0.10}$ | 50 | 365 | 99.2 | 94 | uniform | 99.6 |
| Ex. 2 | $La_{0.72}Nd_{0.10}Sm_{0.06}Mg_{0.12}Ni_{3.38}Al_{0.10}$ | 27 | 375 | 99.0 | 95 | rich in surface layer | 99.5 |
| Ex. 3 | $La_{0.55}Ce_{0.05}Sm_{0.20}Mg_{0.20}Ni_{2.85}Al_{0.15}$ | 25 | 380 | 98.5 | 90 | uniform | 100.0 |
| Ex. 4 | $La_{0.85}Mg_{0.15}Ni_{4.80}Al_{0.20}$ | — | 340 | 98.4 | 93 | rich in surface layer | 99.5 |
| Ex. 5 | $La_{0.85}Mg_{0.15}Ni_{3.60}Al_{0.20}$ | 54 | 358 | 99.4 | 94 | uniform | 99.5 |
| Ex. 6 | same as in Example 5 | 54 | 356 | 99.3 | 94 | rich in surface layer | 99.5 |
| Ex. 7 | $La_{0.49}Nd_{0.15}Pr_{0.15}Hf_{0.01}Mg_{0.16}Ni_{3.37}Al_{0.18}$ | 35 | 360 | 98.8 | 97 | uniform | 99.7 |
| Ex. 8 | $La_{0.78}Y_{0.02}Mg_{0.20}Ni_{3.45}Al_{0.20}Mn_{0.07}$ | 60 | 357 | 98.7 | 96 | rich in surface layer | 99.5 |
| Ex. 9 | $La_{0.55}Pr_{0.06}Nd_{0.19}Mg_{0.20}Ni_{3.30}Al_{0.15}$ | 37 | 365 | 98.2 | 96 | uniform | 99.2 |
| Ex. 10 | same as in Example 9 | 37 | 363 | 98.3 | 95 | uniform | 99.5 |
| Ex. 11 | $La_{0.60}Pr_{0.25}Mg_{0.15}Ni_{3.50}Al_{0.15}$ | 36 | 369 | 98.5 | 93 | rich in surface layer | 99.4 |
| Ex. 12 | $La_{0.70}Pr_{0.15}Mg_{0.15}Ni_{3.55}Al_{0.15}$ | 38 | 377 | 98.5 | 94 | uniform | 99.6 |
| Ex. 13 | $La_{0.80}Pr_{0.10}Mg_{0.10}Ni_{3.50}Al_{0.17}$ | 29 | 345 | 98.0 | 95 | rich in surface layer | 99.8 |
| Ex. 14 | $La_{0.85}Pr_{0.10}Mg_{0.05}Ni_{3.50}Al_{0.17}$ | 26 | 337 | 99.0 | 95 | rich in surface layer | 100.0 |
| Ex. 15 | $La_{0.60}Pr_{0.25}Mg_{0.15}Ni_{3.50}Al_{0.17}$ | 37 | 360 | 98.0 | 96 | rich in surface layer | 99.2 |
| Ex. 16 | $Pr_{0.35}Nd_{0.50}Mg_{0.15}Ni_{3.40}Al_{0.15}$ | 30 | 352 | 98.7 | 96 | uniform | 99.5 |
| Ex. 17 | $La_{0.70}Pr_{0.15}Mg_{0.15}Ni_{3.40}Co_{0.15}Al_{0.15}$ | 35 | 379 | 98.1 | 93 | uniform | 99.7 |
| Ex. 18 | same as in Example 5 | 54 | 356 | 99.2 | 97 | rich in surface layer | 99.6 |
| Ex. 19 | same as in Example 2 | 10 | 376 | 99.3 | 98 | uniform | 99.5 |
| Ex. 20 | same as in Example 2 | 12 | 375 | 99.2 | 98 | rich in surface layer | 99.6 |
| Ex. 21 | same as in Example 12 | 73 | 371 | 98.0 | 91 | uniform | 99.6 |
| Comp. Ex. 1 | same as in Example 1 | — | 366 | 94.0 | 94 | uniform | 80.0 |
| Comp. Ex. 2 | same as in Example 2 | — | 374 | 86.0 | 94 | uniform | 72.0 |
| Comp. Ex. 3 | same as in Example 1 | 50 | 295 | 89.0 | 78 | not diffused | 95.0 |
| Comp. Ex. 4 | same as in Example 1 | 27 | 287 | 87.0 | 82 | not diffused | 94.5 |
| Comp. Ex. 5 | same as in Example 8 | 60 | 280 | 88.0 | 73 | rich in surface layer | 90.0 |
| Comp. Ex. 6 | same as in Example 9 | 37 | 310 | 92.0 | 70 | rich in surface layer | 99.0 |

What is claimed is:

1. A method for producing a rare earth-Mg—Ni based hydrogen storage alloy comprising element A, Mg, and element B, wherein said element A consists of at least one element R selected from rare earth elements including Sc and Y, and optionally at least one element selected from Zr, Hf, and Ca, and said element B consists of Ni and optionally at least one element selected from elements other than element A and Mg, said method comprising:
  first step of mixing an alloy consisting of elements A and B and Mg metal and/or a Mg-containing alloy having a melting point not higher than the melting point of Mg metal, and
  second step of heat-treating a mixture obtained from said first step for 0.5 to 240 hours at a temperature 5 to 250° C. lower than a melting point of said rare earth-Mg—Ni based hydrogen storage alloy to be obtained.

2. The method according to claim 1, wherein a mean particle diameter (D50) of said alloy consisting of elements A and B is 20 to 1000 μm.

3. The method according to claim 1, wherein a mean particle diameter (D50) of said Mg metal and/or a Mg-containing alloy having a melting point not higher than the melting point of Mg metal is 20 to 2000 μm.

4. The method according to claim 1, wherein said Mg-containing alloy having a melting point not higher than the melting point of Mg metal consists of Mg and at least one element selected from Al, Cu, Zn, Ga, Sn, and In.

5. The method according to claim 1, wherein said alloy consisting of elements A and B and Mg metal is mixed in said first step.

6. The method according to claim 1, wherein in said second step, said mixture is heat-treated for 1 to 24 hours at a temperature 20 to 120° C. lower than the melting point of said rare earth-Mg—Ni based hydrogen storage alloy to be obtained.

7. The method according to claim 1, wherein in said alloy consisting of elements A and B, the ratio of an amount of element B in mole/an amount of element A in mole is in the range of 3.50 to 4.80.

8. The method according to claim 1, wherein said alloy consisting of elements A and B is prepared by liquid rapid cooling.

9. The method according to claim 1, wherein said alloy consisting of elements A and B supplied to the first step has been heat treated.

10. The method according to claim 1 further comprising third step of loosening or pulverizing said rare earth-Mg—Ni based hydrogen storage alloy obtained from the second step.

11. The method according to claim 1, wherein said alloy consisting of elements A and B contains not more than 60% $AB_5$ crystal phase.

12. A method for producing an anode for a nickel-hydrogen rechargeable battery, comprising the steps of:
  producing a rare earth-Mg—Ni based hydrogen storage alloy by the method according to claim 1,
  producing a paste comprising said rare earth-Mg—Ni based hydrogen storage alloy, a binder and water,
  applying said paste to a collector, and
  drying said paste.

13. A method for producing a nickel-hydrogen rechargeable battery, comprising the steps of:
  producing an anode for a nickel-hydrogen rechargeable battery by the method according to claim 12, and
  placing a series of electrodes prepared by laminating said anode, a separator, and a cathode, in a can.

* * * * *